Jan. 10, 1933.                    C. W. STONE                     1,894,132
                                  COLOR ANALYZER
                                Filed Aug. 10, 1931
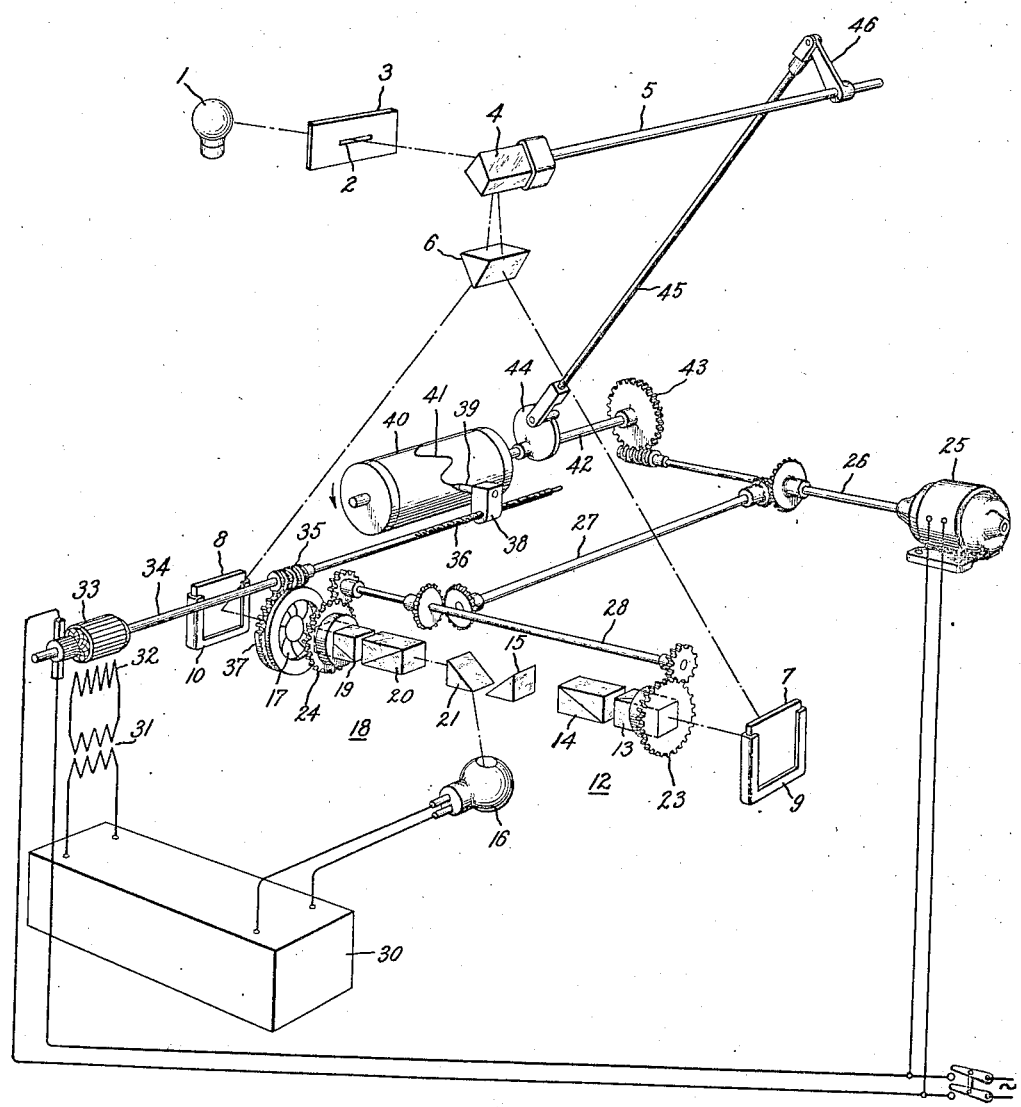
Inventor:
Charles W. Stone,
by Charles E. Fuller
His Attorney.

Patented Jan. 10, 1933

1,894,132

UNITED STATES PATENT OFFICE

CHARLES W. STONE, OF SCHENECTADY, NEW YORK, ASSIGNOR TO GENERAL ELECTRIC COMPANY, A CORPORATION OF NEW YORK

COLOR ANALYZER

Application filed August 10, 1931. Serial No. 556,156.

My invention relates to apparatus for analyzing colors, and more particularly to that form of such apparatus which automatically makes a graphic record showing the various color values of a given sample. It is the object of my invention to provide an improved apparatus for analyzing color which is simple in construction and efficient in operation.

My invention will be better understood from the following description taken in connection with the accompanying drawing, and its scope will be pointed out in the appended claims.

In the single figure of the drawing which illustrates an embodiment of my invention a beam of light from the source 1 passes through the narrow opening 2 in the screen 3 to the prism 4 which it will be noted is a constant deviation prism, the construction of which being well known to those skilled in the art need not be described in detail here. The prism is secured to one end of the shaft 5 mounted in suitable bearings, not shown, the axis of which shaft preferably lies in that plane of the face of the prism at which total reflection of the beam occurs. In passing through prism 4, dispersion of the light beam occurs, producing the usual prismatic spectrum. Beyond the prism 4 is prism 6, whose function is to divide into two parts the light rays comprising a single color band and to refract the two parts in different directions. These two parts are directed respectively on the sample 7 and the standard 8. For convenience the sample and standard are illustrated as square plates supported in holders 9 and 10 respectively. As a result of the above construction an angular movement of prism 4 in one direction causes the several color bands of the spectrum produced by the prism to sweep over prism 6 and successively to illuminate both the sample and the standard. The means for producing the angular movement of prism 4 will be described later.

Light reflected from the sample 7 passes through the light polarizing apparatus 12 shown as comprising the rotatable polarizer 13 and the fixed analyzer 14. Beyond the polarizing apparatus the light is reflected by the prism 15 into the photo-electric tube 16. Likewise, light reflected from the standard 8 after passing through the adjustable diaphragm 17 passes through a similar polarizing apparatus 18 shown as comprising the rotatable polarizer 19 and the fixed analyzer 20 beyond which the light is reflected by the prism 21 into the same photo-electric tube 16. The polarizers 13 and 19 are secured respectively to gears 23 and 24 which are rotated at relatively high speed by the synchronous electric motor 25 through the gearing comprising shafts 26, 27 and 28, which cause the polarizers 13 and 19 to rotate at a predetermined speed with respect to the frequency of the alternating current supply. The polarizing apparatus 12 and 18 are so related to each other that when the one transmits light to the photo-electric tube the other completely cuts off light thereto; hence, light is admitted to the photo-electric tube alternately from sample and standard.

The output circuit of photo-electric tube 16 connects with the amplifier 30, and the output circuit of the amplifier connects through transformer 31 with the field winding 32 of the reversible motor 33, on the shaft 34 of which is the worm 35 and screw 36. Worm 35 engages worm wheel 37 by which the diaphragm 17, shown as an iris diaphragm, is adjusted. Threaded on screw 36 is the nut 38 carrying the pen or pencil 39 which draws on a sheet fastened to the cylinder 40 the curve 41 representing the relative values of the various color components of the sample. Drum 40 is mounted on shaft 42 which is driven by the worm gearing 43 rotated by motor 25. Mounted on the shaft 42 is the cam 44 which through the cooperating rod 45 and crank 46 serves to rock shaft 5 and prism 4 thereon. The above described means by which motor 33 is caused to rotate in one direction or the other to draw the curve and to adjust the diaphragm is similar to that disclosed in the Hardy Patent 1,799,134, March 31, 1931.

In the use of the apparatus, motor 25 through the worm gearing 43 slowly rotates the cylinder 40 bearing the record sheet through approximately one-half of a revolution, and also rotates the cam 44 by which the prism is moved to throw the light of the successive color bands on the sample and standard. At the same time the polarizers 13 and 19 are rapidly rotated in synchronism and in a definite phase relation with the current waves of the supply circuit so that light reaches the photo-electric tube alternately from the sample and the standard. Unless the setting of the diaphragm 17 happens to be such that the light reaching the tube from the sample and the standard is equal, the resulting unequal impulses from the tube after amplification produce an alternating current in the transformer secondary. This current energizes the motor field 32 to cause rotation of the motor armature in one direction or the other in accordance with whether the stronger impulse comes from sample or the standard. The diaphragm thereby is automatically adjusted to give equal impulses and the position of the recorder 39 is a measure of this adjustment. As the prism 4 slowly moves to project light of different color bands on the sample and standard, the diaphragm automatically changes its adjustment and a curve of light values is drawn on the record sheet, two duplicate record curves being drawn for each revolution of the cylinder.

By the arrangement which I have shown and described it will be seen that the sample and the standard are illuminated simultaneously by monochromatic light, the color bands of the spectrum being employed successively for the illumination of the sample and standard. By this arrangement also it will be seen that I have provided a shutter arrangement for admitting light to the photo-electric tube alternately from the sample and standard, which shutter arrangement comprises light polarizing means arranged to admit light to the photo-electric tube successively from the sample and standard.

I have chosen the particular embodiment described above as illustrative of my invention, and it will be apparent that various other modifications may be made without departing from the spirit and scope of my invention, which modifications I aim to cover by the appended claims.

What I claim as new and desire to secure by Letters Patent of the United States, is:

1. A color analyzer comprising a light source, means for dispersing a beam therefrom to produce a spectrum, means for successively directing each of a plurality of color bands of the spectrum on a standard and on a sample, a photo-electric device arranged to receive light alternately from the standard and the sample, and recording means responsive to the output of said device.

2. A color analyzer comprising a light source, a prism arranged to disperse a beam therefrom to produce a spectrum, means for moving said prism to cause each of a plurality of color bands of the spectrum to illuminate a sample and a standard, a photo-electric device, and means comprising a light valve for controlling the passage of light from the sample and the standard to the device.

3. A color analyzer comprising a light source, means for dispersing a beam of light therefrom to produce a spectrum, means for successively directing each of a plurality of color bands of the spectrum on a standard and on a sample, a photo-electric device, and a light valve comprising a light polarizing means between said device and each of the standard and sample.

4. A color analyzer comprising a light source, means for dispersing a beam of light therefrom to produce a spectrum, means for successively directing each of a plurality of color bands of the spectrum on a standard and on a sample, a photo-electric device, light polarizing means comprising relatively rotatable polarizing members between said device and each of the sample and the standard, and means for producing said relative rotation.

5. A color analyzer comprising a light source, a pivotally mounted prism arranged to disperse a beam therefrom to produce a spectrum, means for directing the light of each successive color band simultaneously on a sample and on a standard, a photo-electric device arranged to receive light reflected from the sample and the standard, light valves for controlling the light reflected therefrom, an electric motor and means driven thereby for alternately operating said valves and for moving said prism.

6. A color analyzer comprising a light source, a pivotally mounted prism arranged to disperse a beam therefrom to produce a spectrum, a prism arranged to direct the light of a single color band simultaneously on a sample and on a standard, a photo-electric device arranged to receive light reflected from both said sample and standard, polarizing apparatus in the path of said light comprising fixed and rotatable members, a shutter arranged in the path of light from the standard, a recording device, a motor, means operated by said motor for moving said pivotally mounted prism and for actuating said rotatable members, and a second motor controlled by said photo-electric device for operating said shutter and said recording device.

In witness whereof, I have hereunto set my hand.

CHARLES W. STONE.